United States Patent
Fan et al.

(10) Patent No.: US 10,179,324 B2
(45) Date of Patent: Jan. 15, 2019

(54) LOW-TEMPERATURE AND HIGHLY EFFICIENT DENITRATION CATALYST AND CORRESPONDING METHOD OF PREPARATION

(71) Applicants: Tongji University, Shanghai (CN); Shanghai Tongji Clearon Environmental Protection Equipment Engineering Co. Ltd., Shanghai (CN)

(72) Inventors: Jianwei Fan, Shanghai (CN); Xu Jiang, Shanghai (CN); Hongyang Min, Shanghai (CN); Dandan Li, Shanghai (CN); Minjun Chen, Shanghai (CN); Wangyuan Chen, Shanghai (CN); Yu Sun, Shanghai (CN); Xianqiang Ran, Shanghai (CN)

(73) Assignees: TONGJI UNIVERSITY, Shanghai (CN); SHANGHAI TONGJI CLEARON ENVIORNMENTAL PROTECTION EQUIPMENT, Shanghai (CN)

(*) Notice: Subject to any disclaimer, the term of this patent is extended or adjusted under 35 U.S.C. 154(b) by 422 days.

(21) Appl. No.: 15/176,405

(22) Filed: Jun. 8, 2016

(65) Prior Publication Data
US 2016/0279609 A1 Sep. 29, 2016

Related U.S. Application Data

(63) Continuation of application No. PCT/CN2014/088200, filed on Oct. 9, 2014.

(30) Foreign Application Priority Data

Apr. 4, 2014 (CN) .......................... 2014 1 0136958

(51) Int. Cl.
*B01J 23/34* (2006.01)
*B01D 53/86* (2006.01)
(Continued)

(52) U.S. Cl.
CPC .......... *B01J 23/34* (2013.01); *B01D 53/8628* (2013.01); *B01J 23/10* (2013.01); *B01J 29/0341* (2013.01);
(Continued)

(58) Field of Classification Search
CPC . B01J 23/34; B01J 23/10; B01J 37/024; B01J 37/088; B01J 37/0205;
(Continued)

(56) References Cited

U.S. PATENT DOCUMENTS

2009/0206042 A1* 8/2009 Landau .................. B01J 23/002
210/763

FOREIGN PATENT DOCUMENTS

CN 101391753 A 3/2009
CN 103084166 A 5/2013
(Continued)

OTHER PUBLICATIONS

Fan et al (NPL: "Facile preparation of Cu-Mn/CeO2/SBA-15 catalysts using ceria as an auxiliary for advanced oxidation processes", May 2014, pp. 1065-10661, Material chem.*
(Continued)

*Primary Examiner* — Melvin C. Mayes
*Assistant Examiner* — Smita S Patel
(74) *Attorney, Agent, or Firm* — Edell, Shapiro & Finnan, LLC

(57) ABSTRACT

The present invention relates to a field of control of nitrogen oxide pollution, and involves a high-efficient catalyst for denitration at low temperature and preparation method thereof, which comprises the steps: (1) preparing aqueous
(Continued)

solution of cerium nitrate; (2) soaking mesoporous silica materials SBA-15 with aqueous solution from step (1), after stirring, filtrating, washing and drying; (3) calcining materials from step (2) to obtain evenly dispersed $CeO_2$-SBA-15 materials; (4) preparing ethanol solution of manganese nitrate; (5) soaking $CeO_2$-SBA-15 materials from step (3) with ethanol solution of manganese nitrate from step (4) and volatilizing ethanol, washing and drying; (6) calcining materials from step (5) to obtain evenly distributed $Mn_xO_y/CeO_2$-SBA-15 catalyst for denitration; The preparation method has simple process with lower cost, and the obtained $Mn_xO_y/CeO_2$-SBA-15 catalyst has uniform and ordered pores, large specific area, narrow pore size distribution, well dispersity of catalytic components, high catalytic activity, better effect of denitration at low temperature range and wider temperature range available for denitration.

10 Claims, 1 Drawing Sheet

(51) Int. Cl.
  *B01J 29/03* (2006.01)
  *B01J 35/10* (2006.01)
  *B01J 23/10* (2006.01)
  *B01J 35/00* (2006.01)
  *B01J 37/02* (2006.01)
  *B01J 37/08* (2006.01)

(52) U.S. Cl.
  CPC ....... *B01J 35/0006* (2013.01); *B01J 35/1038* (2013.01); *B01J 35/1061* (2013.01); *B01J 37/024* (2013.01); *B01J 37/088* (2013.01); *B01D 2251/2062* (2013.01); *B01D 2255/2065* (2013.01); *B01D 2255/2073* (2013.01); *B01D 2255/30* (2013.01); *B01D 2258/0283* (2013.01); *B01J 35/1019* (2013.01); *B01J 37/0203* (2013.01); *B01J 37/0205* (2013.01); *B01J 2229/186* (2013.01); *B01J 2523/00* (2013.01)

(58) Field of Classification Search
  CPC ........ B01J 37/0203; B01J 37/02; B01J 37/08; B01J 35/00; B01J 35/10; B01J 35/0006; B01J 35/1038; B01J 35/1019; B01J 35/1061; B01J 2229/186; B01D 53/8628; B01D 53/86; B01D 2255/2073; B01D 2255/2065; B01D 2255/30; B01D 2255/2062; B01D 2251/2062; B01D 2258/0283
  See application file for complete search history.

(56) References Cited

FOREIGN PATENT DOCUMENTS

JP        2003080033 A    3/2003
RU        2490062 C1      8/2013

OTHER PUBLICATIONS

International Search Report in counterpart International Application No. PCT/CN2014/088200, dated Jan. 14, 2015.

\* cited by examiner

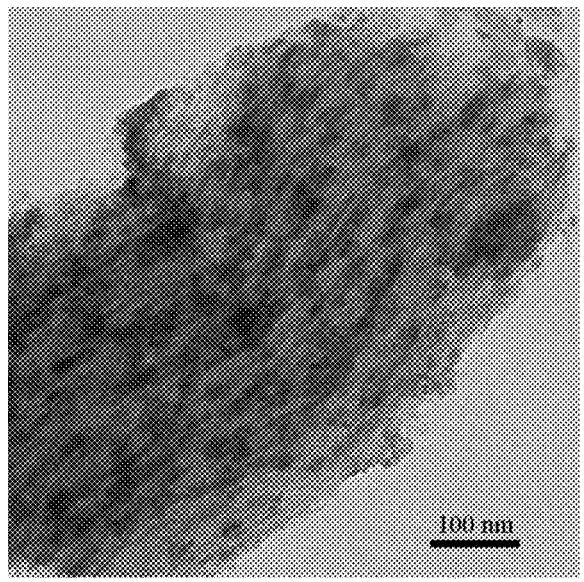

LOW-TEMPERATURE AND HIGHLY EFFICIENT DENITRATION CATALYST AND CORRESPONDING METHOD OF PREPARATION

FIELD OF THE INVENTION

The present invention relates to a field of control of nitrogen oxide pollution, and involves a high-efficient $Mn_xO_y/CeO_2$-SBA-15 catalyst for denitration at low temperature and preparation method thereof.

BACKGROUND

With the development of industry and advancement of society, an increasing attention has been paid to atmospheric pollution. Before the twelfth five years, China only emphasizes on controlling the emission of $SO_2$ but ignores the control of emission of $NO_x$ in the aspect of cleaning up smokes from coal-fired power plant. Datas show that $NO_x$ not only have biological toxicity and do harm to the health of humankind, but also gives rise to a serial of environmental problems such as acidic rains, photochemical smog and ozone layer depletion. It has been reported that the emitting amount of $NO_x$ in China reaches 20 million tons in 2008. If the trend still remains uncontrolled, the emitting amount of $NO_x$ will reach 30 million tons in 2020 and will become the first largest acidic gas pollutant. Just because of that, during the twelfth five years, it has become one of major national decisions of China to comprehensively promote the denitration in coal-fired power plant. As far as the present phase, main denitration techniques at home and abroad include two categories: selective catalytic reduction technique (SCR) and selective non-catalytic reduction technique (SNCR), in which SCR denitration technique is to selectively reduce $NO_x$ by means of $NH_3$ with the presence of catalyst. As compared to the SNCR technique that only uses $NH_3$ as reductant, the SCR denitration technique not only has a higher efficiency of denitration, but also has a lower consumption amount and escaping ratio of $NH_3$, hence, SCR technique is consider to be the most economic and effective technique for denitration.

There are three installation modes for SCR reactor, which are called high-dust smoke SCR (HD-SCR), low-dust smoke SCR (LD-SCR) and tail-end SCR(TE-SCR), respectively. The selected catalysts are generally commercial catalyst $V_2O_5$-$WO_3$/$TiO_2$ or $V_2O_5$-$MoO_3$/$TiO_2$. In the former two installation modes, the SCR reactor is required to be installed before desulfurizing tower, the disadvantage of which lies in that $SO_2$ at high concentration in smoke can cause poisoning of catalyst and bring loss of catalyst's activity; whereas, when TE-SCR technique is adopted, SCR reactor is installed behind desulfurizing tower, which can largely reducing the influence of $SO_2$ on catalyst's performance. However, the biggest problem that this kind of installation mode faces lies in that active temperature window of current commercial vanadium-based catalyst ranges from 300 to 400° C., whereas, temperature of smoke in outlet of desulfurizing tower is commonly at 80 to 150° C., which requires the heating of smoke before its entry into SCR reactor, resulting in the great increase in operating costs. Therefore, it has become a key technical obstacle for SCR denitration technique on how to produce a high efficient SCR catalyst at low temperature. SCR catalyst comprises such two parts as active components and carriers. As far as the catalyst for denitration, selection of carriers tends to be diversified. The carriers mainly include $TiO_2$, zeolite, molecular sieve, $Al_2O_3$, active carbon and so on. These catalysts have their own advantages, but also have inevitable defects, e.g. $TiO_2$ and $Al_2O_3$ don't have enough specific area; zeolite, molecular sieve and active carbon have smaller pore size etc. Consequently, it is vital to select appropriate carriers for catalyst for the purpose of increasing the selectivity of carriers. Active components of catalyst for denitration has tendencies to develop from single component to double components and even multiple components, not only includes common oxides such as W, V, etc, but also includes transition metal oxides such as Fe, Mn, Cu and Ce, etc. These active components can be applicable to diverse temperature ranges and can achieve the goals of elevating catalysts' denitration activities while broadening denitration temperature window by way of coordination of these active components between them. Therefore, it is significantly meaningful for the production of novel and high efficient catalyst for denitration at low temperature through designed combination of active components and carriers of catalyst.

SUMMARY OF THE INVENTION

The present invention aims to provide a high-efficient $Mn_xO_y/CeO_2$-SBA-15 catalyst for denitration at low temperature and preparation method thereof.

To achieve the above goal, the present invention employs the following technical solutions.

A method for preparing high efficient $Mn_xO_y/CeO_2$-SBA-15 catalyst for denitration at low temperature, comprising the following steps:

(1) preparing an aqueous solution of cerium nitrate;
(2) soaking mesoporous silica materials SBA-15 with the aqueous solution obtained from step (1), stirring, filtrating, washing and drying;
(3) placing the materials obtained from step (2) into a muffle furnace and calcining to obtain uniformly dispersed $CeO_2$-SBA-15 materials;
(4) preparing an ethanol solution of manganese nitrate;
(5) soaking the materials from step (3) with the solution from step (4) for a period of time, volatilizing ethanol, washing and drying;
(6) placing the materials obtained from step (5) into a muffle furnace and calcining to obtain uniformly dispersed $Mn_xO_y/CeO_2$-SBA-15 catalyst for denitration.

In step (1), the concentration of cerium nitrate in the aqueous solution of cerium nitrate is 0.1~1 mol/L.

In step (2), dosage of mesoporous silica materials SBA-15 is 10~40 g/L, soaking time is 4~8 h.

In step (3), calcining temperature is 300~500° C. and calcining time is 4~8 h.

In step (4), mass of manganese in the ethanol solution of manganese nitrate accounts for 10~30% of dosage of the $CeO_2$-SBA-15 materials.

In step (5), soaking time is 1~3 h.

In step (6), calcining temperature is 300~500° C. and calcining time is 4~8 h.

A high efficient $Mn_xO_y/CeO_2$-SBA-15 catalyst for denitration at low temperature that is prepared by the method according to any of above-mentioned methods, wherein $Mn_xO_y/CeO_2$-SBA-15 is a mixture of $MnO_2/CeO_2$-SBA-15 and $Mn_2O_3/CeO_2$-SBA-15, which belongs to a catalyst for denitration having multi-pores with novel structure and high performance. The pores have two-dimensional hexagonal structure and are uniform and ordered, the size distribution of which is much larger and ranges from 6~7 nm. The specific area ranges from 300~500 m²/g and volume of pores ranges from 0.3~0.5 cm³/g.

The present invention has the following advantageous effects:

The present invention provides a method for preparing high efficient $Mn_xO_y/CeO_2$-SBA-15 catalyst for denitration at low temperature; the method has simple process and lower cost. The obtained $Mn_xO_y/CeO_2$-SBA-15 catalyst has uniform and ordered pores, better effect of denitration at low temperature range and wider temperature range available for denitration.

BRIEF DESCRIPTION OF THE DRAWINGS

FIG. 1 is a transmission electron microscopy image (TEM) of the catalyst obtained from Example 1 of the present invention.

DETAILED DESCRIPTION OF THE INVENTION

The following is a further explanation of the present invention in combination with the examples and figure.

EXAMPLE 1

(1) At first, preparing 0.5 mol/L of ready-to-use aqueous solution of cerium nitrate.

(2) And then, adding 2 g of SBA-15 into 100 mL of aforementioned aqueous solution of cerium nitrate (20 g/L), stirring for 6 h, then filtrating, washing and drying.

(3) And next, placing the sample obtained from step (2) into a muffle furnace and calcining at 300° C. for 6 h to obtain uniformly dispersed $CeO_2$-SBA-15 materials.

(4) Afterwards, preparing an ethanol solution of manganese nitrate, wherein mass of manganese accounts for 20% of dosage of the $CeO_2$-SBA-15.

(5) Soaking the materials from step (3) with the solution from step (4), stirring for 2 h to volatilize ethanol, washing and drying.

(6) Finally, placing the materials obtained from step (5) into muffle furnace, calcining at 300° C. for 6 h to obtain uniformly dispersed $Mn_xO_y/CeO_2$-SBA-15 catalyst for denitration, wherein $Mn_xO_y/CeO_2$-SBA-15 is a mixture of $MnO_2/CeO_2$-SBA-15 and $Mn_2O_3/CeO_2$-SBA-15, the structural parameter of which is shown in Table 1.

FIG. 1 is a TEM image of the catalyst obtained from Example 1, in which the shadowed area is active metal particles that have been successfully loaded onto SBA-15.

EXAMPLE 2

(1) At first, preparing 0.1 mol/L of ready-to-use aqueous solution of cerium nitrate.

(2) And then, adding 1 g of SBA-15 into 100 mL of aforementioned aqueous solution of cerium nitrate (10 g/L), stirring for 8 h, then filtrating, washing and drying.

(3) And next, placing the sample obtained from step (2) into a muffle furnace and calcining at 500° C. for 4 h to obtain uniformly dispersed $CeO_2$-SBA-15 materials.

(4) Afterwards, preparing an ethanol solution of manganese nitrate, wherein mass of manganese accounts for 30% of dosage of the $CeO_2$-SBA-15.

(5) Soaking the materials from step (3) with the solution from step (4), stirring for 1 h to volatilize ethanol, washing and drying.

(6) Finally, placing the materials obtained from step (5) into a muffle furnace, calcining at 40° C. for 4 h to obtain uniformly dispersed $Mn_xO_y/CeO_2$-SBA-15 catalyst for denitration, wherein $Mn_xO_y/CeO_2$-SBA-15 is a mixture of $MnO_2/CeO_2$-SBA-15 and $Mn_2O_3/CeO_2$-SBA-15, the structural parameter of which is shown in table 1.

EXAMPLE 3

(1) At first, preparing 1 mol/L of ready-to-use aqueous solution of cerium nitrate.

(2) And then, adding 4 g of SBA-15 into 100 mL of aforementioned aqueous solution of cerium nitrate (40 g/L), stirring for 4 h, then filtrating, washing and drying.

(3) And next, placing the sample obtained from step (2) into a muffle furnace and calcining at 400° C. for 8 h to obtain uniformly dispersed $CeO_2$-SBA-15 materials;

(4) Afterwards, preparing an ethanol solution of manganese nitrate, wherein mass of manganese accounts for 10% of dosage of the $CeO_2$-SBA-15.

(5) Soaking the materials from step (3) with the solution from step (4), stirring for 3 h to volatilize ethanol, washing and drying.

(6) Finally, placing the materials obtained from step (5) into a muffle furnace, calcining at 500° C. for 8 h to obtain uniformly dispersed $Mn_xO_y/CeO_2$-SBA-15 catalyst for denitration, wherein $Mn_xO_y/CeO_2$-SBA-15 is a mixture of $MnO_2/CeO_2$-SBA-15 and $Mn_2O_3/CeO_2$-SBA-15, the structural parameter of which is shown in Table 1.

Table 1 shows the structural parameters of $Mn_xO_y/CeO_2$-SBA-15 for denitration that are prepared by the Example 1 to 3.

TABLE 1

| Examples | Pore size (nm) | Pore volume (cm$^3$/g) | Specific area (m$^2$/g) |
|---|---|---|---|
| Example 1 | 6.38 | 0.42 | 421 |
| Example 2 | 6.27 | 0.35 | 397 |
| Example3 | 6.39 | 0.47 | 435 |

A small-scale laboratory smoke denitration experiment is conducted towards the catalysts for denitration prepared by examples. The stimulated airspeed of smoke is 10000 h$^{-1}$, wherein concentration of NO is 1000 ppm, oxygen gas is 5%, carrier gas is $N_2$, $NH_3$ is sprayed as reductant with the volume ratio of $NH_3$/NO being 1.2. The concentrations of NO before and after reaction are monitored by the use of EasyLine continuous gas analyzer. Reactor for denitration is electric heating tubular furnace to maintain the stability of reaction temperature. The denitration efficiency of the catalyst prepared in examples at 100 to 300° C. is shown in Table 2.

Table 2 shows denitration efficiency of $Mn_xO_y/CeO_2$-SBA-15 catalysts for denitration at 100~300° C. that are prepared in the Example 1 to 3.

TABLE 2

| | Example 1 | Example 2 | Example 3 |
|---|---|---|---|
| 100° C. | 85% | 87% | 71% |
| 140° C. | 87% | 89% | 72% |
| 180° C. | 90% | 90% | 74% |
| 220° C. | 91% | 89% | 76% |
| 260° C. | 91% | 88% | 76% |
| 300° C. | 83% | 80% | 74% |

The above experimental results reveal that:

(1) Under the above conditions of reactions, the $Mn_xO_y/CeO_2$-SBA-15 catalysts for denitration prepared by the present invention possess a wider available temperature scope and can reach 70% or above of dinitration efficiency at 100~300° C.

(2) Under the above conditions of reactions, the $Mn_xO_y$/$CeO_2$-SBA-15 catalysts for denitration prepared by the present invention have higher catalytic activities at low temperature range, wherein the denitration efficiency of the catalysts with manganese content reaching 20% or above under the condition of 100~200° C. can arrive at nearly 90%, which is obviously better than normal catalysts.

The above descriptions of embodiments are conducive for ordinary technicians of the present technical field to understand and apply the invention. It is obvious that persons skilled in the art of the present field can easily make various amendments to the above embodiments and apply the general principle illustrated in here into other embodiments without the effort of inventive work. Therefore, the present invention is not confined to embodiments herein. Any improvements and modifications conducted by persons skilled in the art of the present field according to the instructions of the present invention and without going beyond the scope of the present invention shall be included in the extent of protection of the present invention.

What is claimed:

1. A method for preparing catalyst for denitration, wherein the method comprises the following steps:
   (a) preparing an aqueous solution of cerium nitrate;
   (b) soaking mesoporous silica materials SBA-15 with the aqueous solution of cerium nitrate obtained from step (a), then stirring, filtrating, washing and drying;
   (c) calcining the materials obtained from step (b) to obtain $CeO_2$-SBA-15 materials;
   (d) preparing an ethanol solution of manganese nitrate;
   (e) soaking the $CeO_2$-SBA-15 materials from step (c) with the ethanol solution of manganese nitrate from step (d), then volatilizing ethanol, washing and drying; and
   (f) calcining the materials obtained from step (e) to obtain $Mn_xO_y$/$CeO_2$-SBA-15 catalyst for denitration.

2. The method according to claim 1, wherein in step (a) the concentration of the aqueous solution of cerium nitrate is 0.1 mol/L to 1 mol/L.

3. The method according to claim 1, wherein in step (b) dosage of mesoporous silica materials SBA-15 is 10 g/L to 40 g/L.

4. The method according to claim 1, wherein in step (b) soaking time is 4 to 8 hours.

5. The method according to claim 1, wherein in step (c) calcining temperature is 300° C. to 500° C. and calcining time is 4 hours to 8 hours.

6. The method according to claim 1, wherein in step (d) a mass of manganese in the ethanol solution of manganese nitrate accounts for 10% to 30% of dosage of the $CeO_2$-SBA-15 materials.

7. The method according to claim 1, wherein in step (e) soaking time is 1 hour to 3 hours.

8. The method according to claim 1, wherein in step (f) calcining temperature is 300° C. to 500° C. and calcining time is 4 hours to 8 hours.

9. The method according to claim 1, wherein and $Mn_xO_y$ is $MnO_2$ and $Mn_2O_3$.

10. The method according to claim 1, wherein pores of the catalyst have two-dimensional hexagonal structures, and sizes of the pores range from 6 nm to 7 nm, specific areas of the pores range from 300 m2/g to 500 m2/g, and volumes of the pores range from 0.3 cm3/g to 0.5 cm3/g.

* * * * *